June 6, 1933.     L. F. TROXEL     1,913,252
VEHICLE LOCATION INDICATOR
Filed Sept. 30, 1931    2 Sheets-Sheet 1
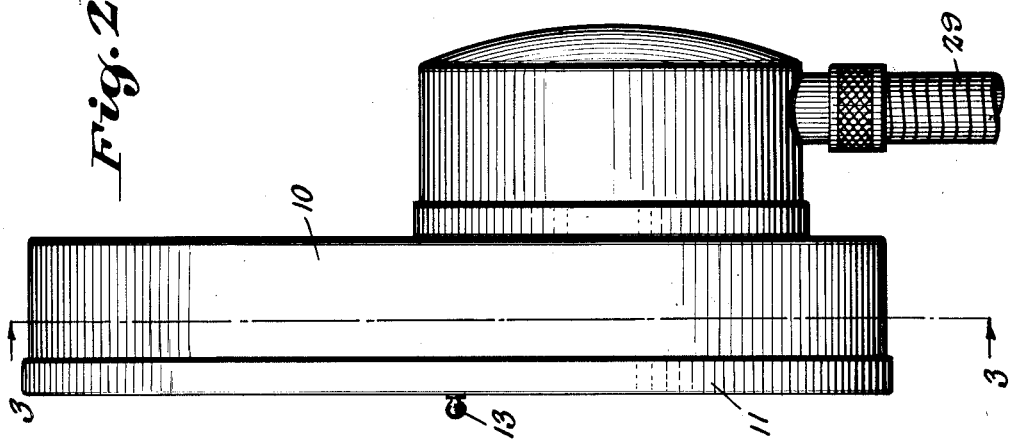
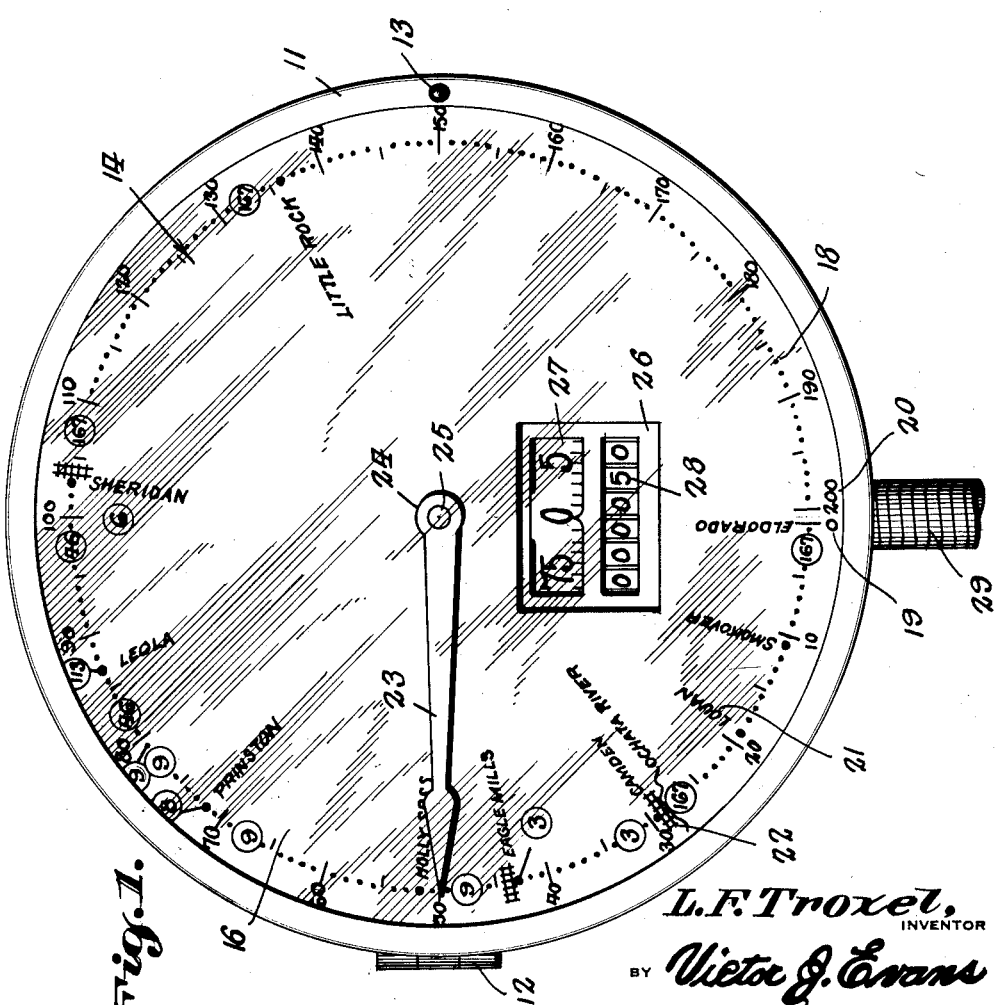
L. F. Troxel,
INVENTOR
BY Victor J. Evans and Co.
ATTORNEY

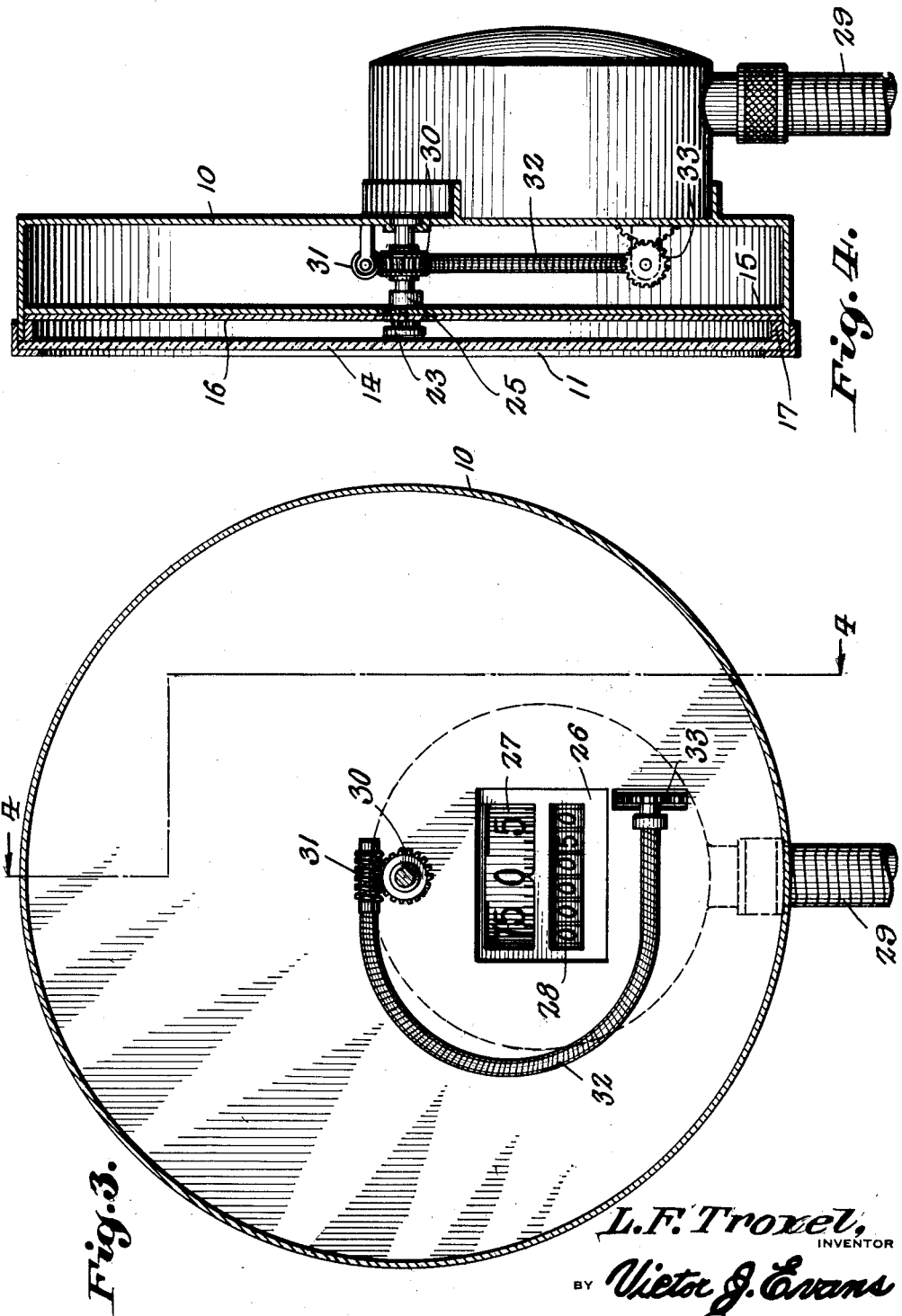

Patented June 6, 1933

1,913,252

UNITED STATES PATENT OFFICE

LOWE F. TROXEL, OF EL DORADO, ARKANSAS

VEHICLE LOCATION INDICATOR

Application filed September 30, 1931. Serial No. 566,083.

The invention relates to a meter and more especially to what is termed a road meter or an instrument to be attached to automobiles, passenger coaches, Pullman cars and busses or interurban traffic vehicles.

The primary object of the invention is the provision of an instrument of this character wherein the same will make visible road courses and particularly that traveled by the vehicle equipped with the instrument so that the passengers can at any time determine the distance traversed as well as the distance between certain points of the route and also the particular location of such vehicle at the time of inspection of the chart in the instrument, the instrument being of novel form so as to accurately indicate the mileage upon such chart as traveled by the vehicle.

A further object of the invention is the provision of an instrument of this character which is comparatively simple in construction, thoroughly effective and efficient in its operation, neat and attractive in appearance, automatic in its action, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:—

Figure 1 is a front elevation of an instrument constructed in accordance with the invention showing a chart of a particular route therein.

Figure 2 is a side elevation thereof.

Figure 3 is a sectional view on the line 3—3 of Figure 2 looking in the direction of the arrows.

Figure 4 is a sectional view on the line 4—4 of Figure 3 looking in the direction of the arrows.

Similar reference characters indicate corresponding parts throughout the several views in the drawings.

Referring to the drawings in detail, the instrument comprises a circular casing 10 preferably made from sheet metal although it may be otherwise made and carries a door 11 at its front which is hinged at 12 to the casing. This door is latched closed as at 13, and is in the form of a rim for supporting a front transparent panel or glass 14 and when closed telescopes over the front edge of said casing 10.

Formed interiorly of the casing 10 is a backing plate or partition 15 which corresponds to the shape of said casing and is inset from the front edge thereof for the placement thereupon of a route chart or log dial 16, the latter being removably held in confronting relation to the panel or glass 14 through the medium of a detachable retaining ring 17 and this chart marginally thereof has laid out through the medium of printing or otherwise a particular route 18, the same being scaled to give information of mileage from a starting point 19, the latter being selective to a finishing point 20 thereof and also identifying as at 21 certain towns and road conditions 22 enroute. This chart in its markings may be varied to any extent to give information to an observer as may be of interest and required when traveling from one destination to another.

The chart 16 is adapted to be traversed by a pointer or indicator hand 23 which is frictionally engaged at 24 with an arbor 25 located centrally of the casing and suitably protruded through the plate or partition 15 and the chart 16 and this hand can be set at any particular point of the scale 18 selected as the starting point for the tour or route to be taken by the vehicle equipped with the instrument so that a passenger or occupant of such vehicle can at a glance to the instrument determine the mileage enroute and the particular location of the vehicle at the time of inspection of such instrument as well as the mileage as may be covered by said vehicle from the starting point of the same.

The partition 15 as well as the chart 16 has formed therein, each a window 26, these registering with each other and through which are visible the speedometer wheel 27 and the mileage register 28, these being of standard construction and operated in the usual manner through connection (not shown) with the driving shaft of a motor driven vehicle, the connection being encased within a flexible tube 29 as is common in the mounting of a speedometer or mileage register of standard make.

The arbor 25 for the indicator hand 23 carries a gear 30 at its inner end which meshes with a worm screw 31 driven from a flexible shaft 32 which is operated through the train of gears 33 from the mileage register 28. When the vehicle is traveling from a determined point, if the indicator hand or pointer 23 has first been set at such starting point, said pointer will traverse the log or chart 16 and the occupants or passengers within the vehicle can at any time inspect the instrument and determine the exact location of such vehicle at a given time and also gain full knowledge of the complete mileage enroute as well as the mileage distances between certain points.

The log chart 16 is made up in accordance to a selected route its mapping being consistent with such route.

What is claimed is:—

An instrument of the character described comprising a circular casing provided with a transparent panelled front door, a backing plate interiorly of the casing, a route chart disposed against said plate and having indicia exposed through the panelled door indicative of a determined route, certain towns thereof and road conditions of the same and also mileage of the complete route and between determined points thereof, a pointer movable over the chart, an arbor rotatably mounted centrally of the casing and frictionally supporting the pointer and permitting hand setting of the latter, and speedometer mechanism mounted with the casing and exposable through the panelled door and having driving connections with said arbor.

In testimony whereof I affix my signature.

LOWE F. TROXEL.